United States Patent [19]
Beckers

[11] Patent Number: 6,016,777
[45] Date of Patent: Jan. 25, 2000

[54] EXHAUST VALVE HOLDER

[76] Inventor: Michael B. Beckers, 402 Banner Rd., Pullman, Wash. 99163

[21] Appl. No.: 09/058,880

[22] Filed: Apr. 13, 1998

[51] Int. Cl.<sup>7</sup> .................................................. F02B 75/00

[52] U.S. Cl. .................................. 123/65 PC; 123/65 P; 123/65 EM; 123/65 V; 123/65 PD

[58] Field of Search ................... 251/214; 123/65 PE, 123/65 V, 65 PD, 65 P, 65 EM, 190.17, 188.6, 188.9

[56] References Cited

U.S. PATENT DOCUMENTS 5,660,152  8/1997  Masuda ................... 123/65 PE

*Primary Examiner*—Noah P. Kamen
*Assistant Examiner*—Hai Huynh

[57] ABSTRACT

An exhaust valve holder including accommodations for additional sealing and resistance to movement. This includes a groove wide enough for two sealing o-rings, a groove or slot which does not run the circumference of the holder and binds against a tab of a holder plate to resist rotational movement and a one piece design.

1 Claim, 2 Drawing Sheets

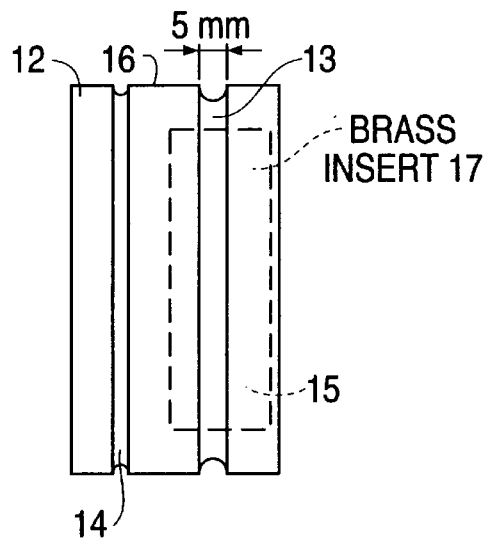
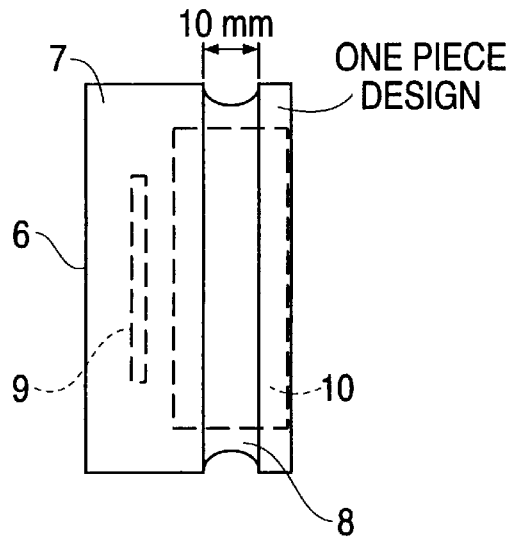
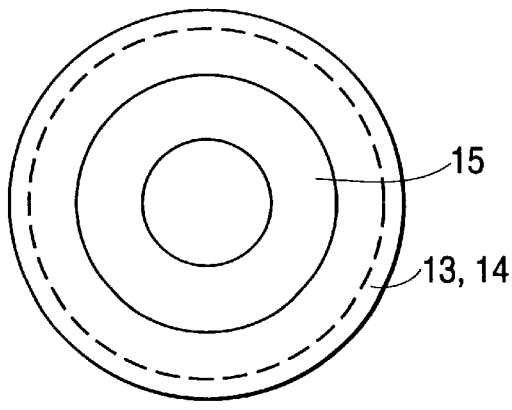
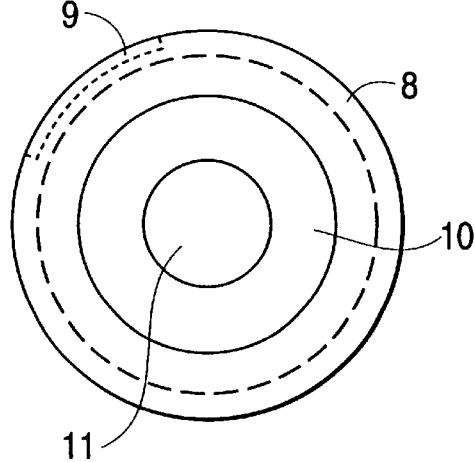

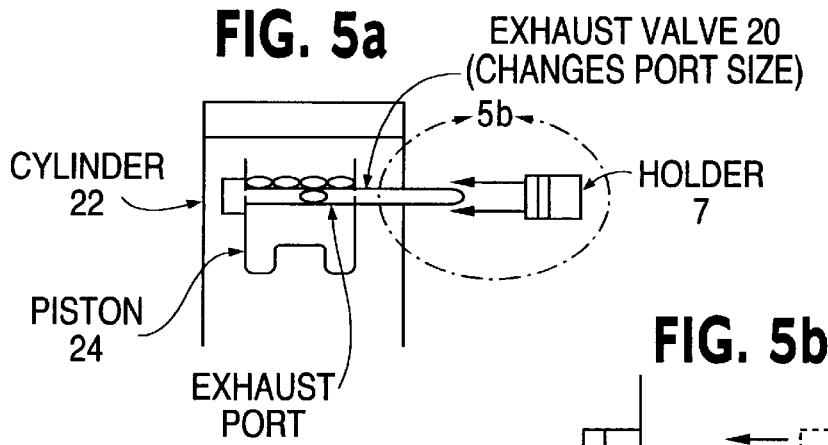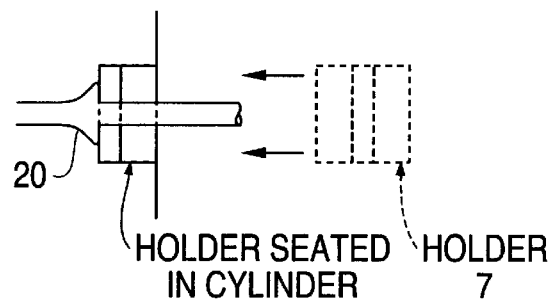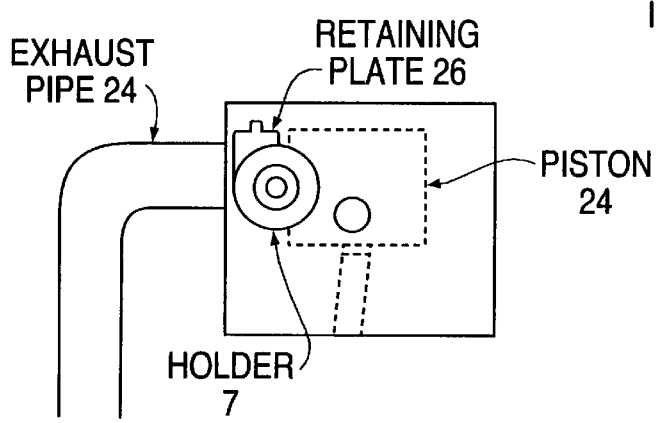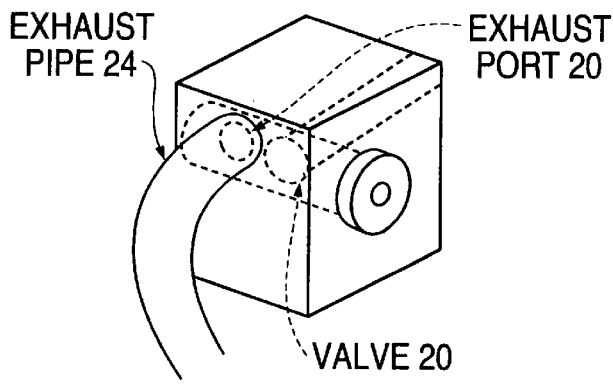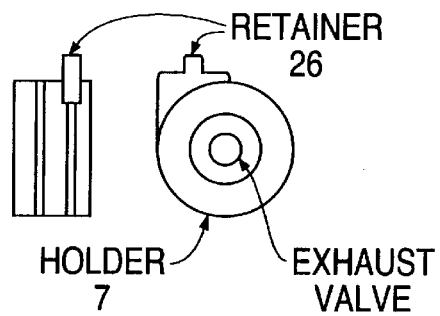

EXHAUST VALVE HOLDER

BACKGROUND OF THE INVENTION

1. Field of the Invention

The present invention is directed to an improved exhaust valve holder and, more particularly, to a holder that improves performance by reducing leakage, vibration and rotation.

2. Description of the Related Art

Conventional exhaust valve holders tend to move back and forth (vibrate) as well as rotate as the exhaust valve opens and closes. This tends to result in destruction of the seal causing leakage reducing efficiency. What is needed is a holder that reduces vibration and rotation and thereby the resultant leakage.

SUMMARY OF THE INVENTION

It is an object of the present invention to provide an exhaust valve holder that reduces leakage and movement in an exhaust valve holder application.

It is a further object of the present invention to provide a valve that has reduced rotational motion, thereby reducing wear.

It is another object of the present invention to improve performance of a motor, particularly, a two-cycle motor.

It is another object of the present invention to reduce wear and improve valve holder assembly life expectancy.

It a further object of the present invention to extend the life of the valve itself.

It is an additional object of the present invention to prevent engine failure due to air leakage caused by damaged seals.

The above objects can be attained by an exhaust valve assembly that includes a double wide seal grove allowing an increase in the number of seals that can be used. Holder rotation is reduced by a groove that locks the holder in place with a holding plate fitting the groove, stopping rotation.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts a front view of a conventional exhaust valve holder.

FIG. 2 depicts a front view of the present invention.

FIG. 3 depicts a side view of a conventional exhaust valve holder.

FIG. 4 depicts a side view of the present invention.

FIGS. 5a–5e depict the relationship of the holder to the engine and exhaust pipe.

DESCRIPTION OF THE PREFERRED EMBODIMENTS

The present invention is designed for an exhaust valve holding application where a conventional holder tends to improperly seal the cylinder and/or is been damaged by movement.

The present invention, depicted in FIGS. 2, 4 and 5, is preferably made from cylindrical stock billet aluminum while a conventional holder is depicted in FIGS. 1 and 3. The present invention can be constructed from aluminum or some other metal, such as steel, or a ceramic that is suitable for combustion motor parts.

The conventional holder 12, as depicted in FIG. 1, has a grooved cylinder 16 and a brass insert 15 requiring that two pieces be manufactured to close tolerances. The holder 7 of the present invention is a one piece design such that the function of the insert is integral with the holder and manufactured as a single piece.

The holder 7 differs from a conventional valve holder 12 in that it does not have a press fit insert 15. Rather, this part is cut as an integral part of the holder 7. The present invention also has a double wide O-ring groove 8 which allows for two O-rings for better sealing. The stock holder only accommodates one O-ring in a conventionally sized groove 13. The present invention also has a slot or groove 9 which is used to locate the holder and hold it in position using a conventional holding plate (not shown) which stops rotational motion. The plate is attached to the engine and fits into the slot 9. As the holder attempts to rotate, the holder plate binds against the end of the slot or groove 9 preventing rotation. This non-circumferential groove 9 differs from the conventional groove 14 in that it does not travel the circumference of the holder 7. This allows the holder 7 to be locked with the holding plate, stopping any movement. A recess 10 is provided that allows the holder 7 to be fit onto a grease seal. The opposite end 6 of the holder 7 from the recess 10 fits against the exhaust valve.

The holder 7 is made from cylindrical billet aluminum stock which is first mounted on a spindle lathe. A 3.5 cm length is then turned to a diameter of 5.3 cm providing the outside diameter of the holder. At a distance of 2 cm from the face end of the turned down section, the groove 8 is cut around the circumference of the piece. This cut is made to a depth of 2 mm with that same dimension radiused transversely across the groove. The piece is then cut at both ends of the 3.5 cm length and released from the stock. The piece then has groove 9 routed at a distance 5 mm of the face end and at a depth of 2 mm for a distance of 10 mm. A 1.5 cm hole 11 is then drilled through the piece normal to the face surface all the way through the piece. This hole accommodates the exhaust valve shown on FIG. 5. The piece is remounted in the lathe and the recess 10 is then cut in the end face with a diameter of 2.05 cm and a depth of 2 cm. This cut is not radiused. The piece is then deburred.

The present invention replaces the stock holder without any modification to the motor cylinder assembly. There is a need to use four o-rings in the application of the present invention as opposed to using two O-rings in the stock application. Once the two O-rings are in groove 8, the holder can be put in place as shown in FIG. 5. The holder 7 of the present invention bolts in place between the exhaust valve and the piston cylinder just as the conventional holder does. A holding plate having a tab is placed in groove 9 and bolted to the cylinder.

FIGS. 5a–5e depict a relationship of the holder 7 of the invention to exhaust valve 20 the cylinder 22, piston and exhaust pipe 24. The holding plate 26 or retaining plate fits in the groove 9 of the holder 7.

The present invention has been described with respect to using a slot or non-circumferential groove to prevent rotation of the holder. A pin hole could also be used instead of a slot. The holder groove can also be cut around the entire circumference of the holder, which is easier to machine than the partial circumference groove. This allows a tension pin to be inserted normal to the groove on either side of the pin. Holes are drilled to accommodate the tension pins.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An exhaust valve holder assembly, comprising:

a holder plate;

a cylinder frictionally receiving and holding an exhaust valve in place, said cylinder comprising:

an O-ring groove cut normal to a radius of the cylinder, cut into a side of the cylinder and having a width sufficient to hold two O-rings;

a non-circumferential holding plate groove cut normal to the radius of the cylinder, cut into the side of the cylinder and receiving said holder plate;

tension pins set on a side of the holder plate in said cylinder;

a recess integral with the cylinder for being greased to provide a grease seal; and a hole running the length of the cylinder and an end opposite to said recess accommodating the exhaust valve.

* * * * *